US010677987B1

(12) United States Patent
Dumais

(10) Patent No.: US 10,677,987 B1
(45) Date of Patent: Jun. 9, 2020

(54) POLARIZATION INDEPENDENT PHOTONIC DEVICE HAVING MULTIMODE COMPONENT

(71) Applicant: Patrick Dumais, Ottawa (CA)

(72) Inventor: Patrick Dumais, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/410,430

(22) Filed: May 13, 2019

(51) Int. Cl.
*G02B 6/27* (2006.01)
*G02F 1/01* (2006.01)
*G02B 6/12* (2006.01)

(52) U.S. Cl.
CPC ............ *G02B 6/276* (2013.01); *G02F 1/011* (2013.01); *G02B 2006/12061* (2013.01); *G02F 2001/0113* (2013.01); *G02F 2203/06* (2013.01)

(58) Field of Classification Search
CPC ..... G02B 6/276; G02B 6/2766; G02B 6/2773
See application file for complete search history.

(56) References Cited

U.S. PATENT DOCUMENTS

| 4,936,644 | A | 6/1990 | Raskin | |
|---|---|---|---|---|
| 5,654,818 | A | 8/1997 | Yao | |
| 5,708,734 | A | 1/1998 | Van Der Tol | |
| 9,122,006 | B1 * | 9/2015 | Roth | G02B 6/126 |
| 9,459,406 | B2 * | 10/2016 | Matsumoto | G02B 6/1228 |
| 9,529,151 | B2 * | 12/2016 | Goi | G02B 6/126 |
| 9,557,482 | B2 * | 1/2017 | Oka | G02B 6/105 |
| 9,746,609 | B2 * | 8/2017 | Ma | G02B 6/125 |
| 9,829,632 | B2 * | 11/2017 | Ma | G02B 6/1228 |
| 9,915,781 | B1 * | 3/2018 | Lin | G02B 6/126 |
| 10,101,531 | B2 * | 10/2018 | Tu | G02B 6/126 |
| 10,488,590 | B2 * | 11/2019 | Park | G02B 6/2773 |
| 2004/0202440 | A1 * | 10/2004 | Gothoskar | G02B 6/1228 385/129 |
| 2019/0302361 | A1 * | 10/2019 | Oh | G02B 6/122 |
| 2019/0310424 | A1 * | 10/2019 | Lamponi | G02B 6/126 |

OTHER PUBLICATIONS

J. Wang, el al., "Proposal for fabrication-tolerant SOI polarization splitter-rotator based on cascaded MMI couplers and an assisted bi-level taper," Optics Express Nov. 2014 | vol. 22, No. 23 p. 27869.
Y. Ma et al "Symmetrical polarization splitter/rotator design and application in a polarization insensitive WDM receiver," Optics Express vol. 23 No. 12 p. 16052 (2015).
Y. Zhang et al, "On-chip silicon photonic 2 × 2 mode- and polarization-selective switch with low inter-modal crosstalk," p. 526 vol. 5, No. 5 / Oct. 2017 / Photonics Research.

(Continued)

*Primary Examiner* — Rhonda S Peace

(57) ABSTRACT

The present invention provides a photonic device such as a variable optical attenuator, in which two signal components, propagating in modes of two different polarization states, are converted to two different modes of the same polarization state prior to modulation. The modulation of both components is performed by a single device which applies the same modulation strength to both components. The two signal components can be converted back to propagate in the two different polarization states following modulation.

20 Claims, 12 Drawing Sheets

(56) References Cited

OTHER PUBLICATIONS

D. Vermeulen "Silicon-on-Insulator Polarization Rotator Based on a Symmetry Breaking Silicon Overlay," IEEE Photonics Technology Letters vol. 24 No. 6 p. 482 (2012).
H. Fukuda, "Silicon photonic circuit with polarization diversity," Optics Express vol. 16 No. 7 p. 4872 (2008).
D. J Goodwill et al., "Dual-Core Polarization Diverse Silicon Photonic Add/Drop Switch Supporting 400Gb/s PDM-16QAM." Optical Fiber Communications Conference 2017 paper Tu2l.3.
W. D. Sacher et al., "Polarization rotator-splitters in standard active silicon photonics platforms," Feb. 2014 | vol. 22, No. 4 | DOI:10.1364/OE.22.003777 | Optics Express 3777.
Timo Aalto, "Thick-SOI for PICs and I/O coupling," PIC International, Brussels, Mar. 2017.
W.D. Sacher, et al., Polarization rotator-splitters and controllers in a Si3N4-on-SOI integrated photonics platform, Optics Express, 22(9), 11167, 2014.

* cited by examiner

POLARIZATION INDEPENDENT PHOTONIC DEVICE HAVING MULTIMODE COMPONENT

CROSS-REFERENCE TO RELATED APPLICATIONS

This is the first application filed for the present invention.

FIELD OF THE INVENTION

The present invention pertains to the field of optical or photonic devices and in particular to a polarization independent photonic device having a multimode component.

BACKGROUND

Silicon photonics (SiPh) has many potential applications in telecommunications systems due to low fabrication cost, leveraging of existing CMOS technology, and compactness. Currently, signal transceivers are a primary commercial application for silicon photonics devices. Typical applications require or would benefit from a low fiber-to-chip insertion loss. Polarization independence is also a requirement for many applications.

Nanophotonic silicon waveguides typically have a high birefringence. Active devices such as p-i-n junction based phase shifters and modulators also have polarization dependence that stems from the difference in overlap (or confinement) of the so-called Transverse Electric (TE) and Transverse Magnetic (TM) optical modes within the silicon cores. Polarization dependence can be problematic as different portions of the same optical signal are subject to different conditions.

Polarization dependence of silicon nanophotonic circuits can effectively be addressed through what is known as "polarization diversity". In this approach, both polarization components of optical signals are separated shortly after entry into the silicon optical chip, with one of the components converted to the same polarization as the other. The two components are then processed by two identical but separate circuits, after which one of the components is converted back to the orthogonal polarization and combined with the other upon exiting the silicon optical chip. In some implementations of polarization diversity, the two components are processed in the same photonic circuit, but in reverse directions. In any case, the polarization splitters and converters required to implement polarization diversity introduce some impairments to the optical signals, such as loss, polarization dependent loss, and polarization crosstalk. This and the duplication of the photonic circuits, if it is employed, increases the size, complexity, and cost of these photonic devices.

Variable optical attenuators (VOAs) are a useful general-purpose optical component that can be used for channel equalization or modulation, typically at a lower frequency than dedicated high-speed modulators. A VOA can be implemented using a p-i-n junction in which the optical signal can be controllably attenuated by the injection of carriers (e.g. via an electrical current applied to the junction). Another VOA implementation utilizes an integrated Mach-Zehnder interferometer. Such a modulator is driven by an optical phase change which can be driven using a p-i-n junction or a locally heated waveguide section, typically referred to as a thermo-optic phase shifter.

Micron-scale silicon waveguides can yield polarization independent devices. However, carrier injection devices in such platforms are currently limited in modulation frequency, to a maximum of approximately 1 MHz.

Therefore there is a need for a photonic device for adjusting (e.g. attenuating, phase-shifting, or both) optical signals, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a polarization independent photonic device having a multimode component. This may be a polarization independent modulator having a bimodal waveguide. According to various embodiments, a polarization-independent electro-optic (photonic) modulator device, such as a variable optical attenuator, is provided. The invention may exhibit reduced impairments, complexity or cost, or a combination thereof, in comparison to comparable existing polarization-independent devices.

In accordance with embodiments of the present invention, there is provided a photonic device having a modulator situated between first and second mode converters. The first mode converter is configured to receive an optical signal having a first component and a second component propagating in different respective polarization states, and to convert one or both of the first component and the second component to both propagate in different respective modes of a same polarization state. The modulator is configured to receive optical output of the first mode converter, and to apply a controlled gain, a controlled phase shift, or both, to both the first component and the second component as output by the first mode converter. The second mode converter is configured to receive optical output of the modulator, the optical output comprising the first component and the second component propagating in said different respective modes of the same polarization state, and to convert one or both of the first component and the second component as output by the modulator to cause the first component and the second component to propagate in different respective polarization states. The photonic device may be fabricated in a silicon-on-insulator structure.

In various embodiments, the modulator includes a multimode waveguide configured to carry both of said different respective modes of the same polarization state and the modulator is further configured to apply the controlled gain, the controlled phase shift, or both, concurrently to each of the different respective modes within the multimode waveguide. The modulator may include a p-i-n junction structure operatively coupled to the multimode waveguide, and the modulator may be configured to apply the controlled gain, the controlled phase shift, or both, using a carrier injection effect. The modulator may have a same or similar modulation strength with respect to each of the aforementioned different respective modes of the same polarization state. This same or similar modulation strength may be due to a corresponding same or similar modal overlap of each of said different respective modes of the same polarization state with a multimode waveguide of the modulator. The multimode waveguide may be a rib waveguide, and the modal overlap may be configured at least in part by configuring a width of the rib waveguide. The modulator may be a variable optical attenuator, a phase shifter, or a combination thereof.

In various embodiments, the mode converters are be bi-level taper mode converters.

In some embodiments, an additional modulator is operatively coupled to an input of the first mode converter or operatively coupled to an output of the second mode converter, the additional modulator cooperating with the modulator and configured to apply another controlled gain, another controlled phase shift, or both, to both the first component and the second component of the optical signal, when the first component and the second component are propagating in said different polarization states. The first modulator may exhibits a first difference in modulation strength across each of said different respective modes of the same polarization state, and the additional modulator may exhibit a second difference in modulation strength across modes of said different polarization states. The second difference in modulation strength at least partially compensates for the first difference in modulation strength.

In some embodiments, prior to the first mode converter, the first component propagates in a mode of a transverse electric (TE) polarization state and the second component propagates in a mode of a transverse magnetic (TM) polarization state. In some embodiments, the first mode converter passes the first component without mode conversion and converts the second component with respect to both mode order and polarization state. The second component may be converted from a fundamental mode to a first order mode.

In accordance with embodiments of the present invention, there is provided a method for modulating an optical signal in a photonic device. The optical signal initially has a first component and a second component propagating in different respective polarization states. The method includes converting one or both of the first component and the second component to both propagate in different respective modes of a same polarization state. The method includes applying a controlled gain, a controlled phase shift, or both, to both the first component and the second component following said converting. The method includes converting one or both of the first component and the second component, following said applying the controlled gain, to cause the first component and the second component to propagate in different respective polarization states.

In various embodiments, the controlled gain, the controlled phase shift, or both, are applied concurrently to both the first component and the second component while co-propagating in a single multimode waveguide structure. The controlled gain, the controlled phase shift, or both, may be applied using a modulator having a same or similar modulation strength with respect to each of said different respective modes of the same polarization state.

In some embodiments, the method further includes, cooperatively with application of the controlled gain, the controlled phase shift, or both: applying another controlled gain, another controlled phase shift, or both, to both the first component and the second component of the optical signal, when the first component and the second component are propagating in said different polarization states.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
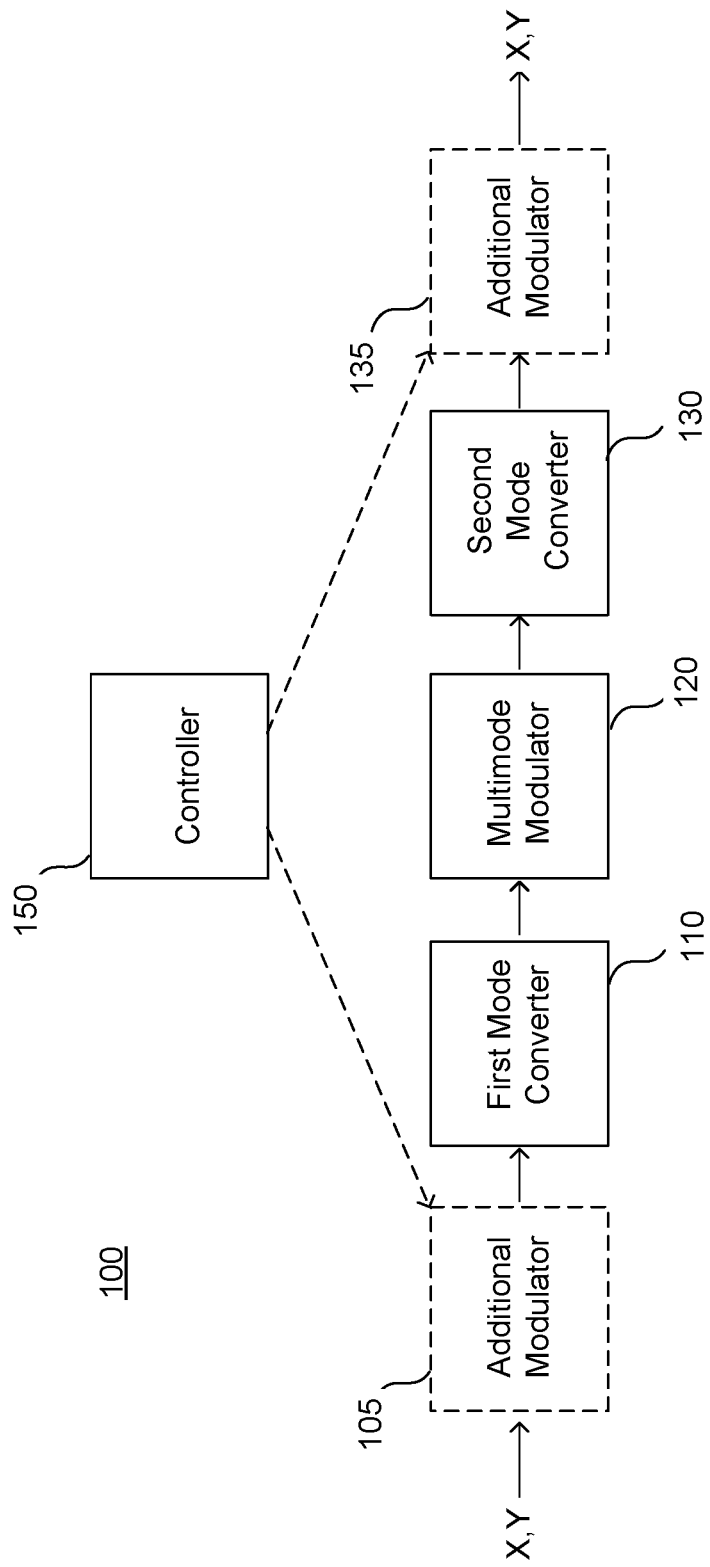
FIG. 1 is a block diagram illustrating a photonic device provided according to embodiments of the present invention.

Unless defined otherwise, all technical and scientific terms used herein have the same meaning as commonly understood by one of ordinary skill in the art to which this invention belongs.

The term "mode" refers to a spatial mode in which an optical signal (or component thereof) propagates. As used herein, a mode refers to a waveguide mode. Modes can be classified by polarization state, so as to group modes for example into transverse electric (TE) modes and transverse magnetic (TM) modes. The TE modes include TE0 (fundamental mode), TE1 (first order mode), TE2, etc., while the TM modes include TM0, TM1, TM2, etc. The different numerical value following TE or TM correspond to different mode orders and may generally indicate the complexity (e.g. number of maxima and minima) of the mode's cross section. As used herein, the mode order refers to horizontal or in-plane modes, and as the structures discussed herein have no higher order modes in the vertical direction, that such a numeral for the vertical direction is omitted. It should be understood that other labelling conventions, such as indexing modes using two numerical values (e.g. $TE_{x,y}$ or $TM_{x,y}$ where x and y are given whole numbers from 0 upward) can also be used and are incorporated into embodiments of the present invention.

The term "modulator" refers to a photonic device that is operable to adjust amplitude, phase, or both amplitude and phase of an optical signal. In many cases, the adjustment can be varied based on an input control signal. The adjustment is not necessarily performed in order to convey data via a carrier signal. Examples of a modulator include a VOA and a phase shifter.

The term "Transverse Electric" (TE) refers to one of the two principal polarization states of waveguide optical modes. The term is used to describe a class of optical spatial modes for which the major component of the modal electrical field is oriented in the plane of the photonic integrated circuit, for integrated waveguides.

The term "Transverse Magnetic" (TM) refers to the other of the two principal polarization states of waveguide optical modes. The term is used to describe a class of optical spatial modes for which the major component of the modal electrical field is oriented perpendicular to the plane of the photonic integrated circuit, for integrated waveguides.

Single mode waveguides refer to optical waveguides supporting a single spatial mode for a given polarization state. Multimode waveguides refer to optical waveguides supporting multiple spatial modes of a given one or more polarization states.

The term "silicon-on-insulator" refers to a platform for integrated photonics which comprises a thin layer of silicon on a silicon substrate, separated by a few-micron layer of thermal oxide. The thin layer is etched to form waveguides. One or more further layers, such as oxide and metal layers, are deposited on top of the patterned silicon layer, and patterned to add electrical connectivity and other functions.

Ridge waveguides refer to optical waveguides in which the cross-section is approximately rectangular, typically formed by a full etch patterning of the thin silicon layer or some other deposited layer.

Rib waveguides refer to optical waveguides formed by the partial etch of a material layer (e.g. silicon), leaving a slab of the material surrounding the elevated rib(s) forming the waveguide core.

Embodiments of the present invention provide for a multimode modulator and associated method, in which two optical modes having relatively more operational difference (e.g. due to having different polarization states) are converted to two optical modes having relatively less operational difference (e.g. due to having the same polarization state). The operational difference can correspond to the difference in response to a same modulation input made by a given modulator, for example due to a difference in modulation gain of the modulator with respect to two modes. The conversion may involve converting only one of the optical modes. Subsequent to the conversion, modulation is performed by a multimode modulator, for example operating on a carrier injection principle. Subsequent to the modulation, another mode conversion may be performed, for example to reverse the effects of the first mode conversion.

A significant insight leading to the present invention is the observation that different spatial modes of the same polarization state can be more readily handled together than spatial modes of different polarization states. Modulators (attenuators, phase shifters and similar devices) are typically polarization dependent, and it has been recognized by the inventors that a modulator applying same or similar adjustment (e.g. attenuation) to two modes of the same polarization state (e.g. TE0 and TE1) is more readily constructed than a modulator applying same or similar adjustment to two modes of two different polarization states (e.g. TE0 and TM0). Such a modulator is referred to herein as a multimode modulator. Therefore, embodiments of the present invention comprise performing an appropriate polarization state conversion (typically along with a mode conversion) on an input signal prior to subjecting the signal to a modulator operation, such as an attenuator operation. Following the operation, the signal can be converted back to its original form, or another appropriate form, via a second polarization state conversion, mode conversion, or combination thereof.

FIG. 1 illustrates, in block diagram form, a photonic device 100 provided according to an embodiment of the present invention. The device comprises a first mode converter 110, a modulator 120 (also referred to as a multimode actuator) and a second mode converter 130, all operatively coupled in series. The first mode converter 110 may be coupled to an input waveguide propagating two components, X and Y, of an optical signal. These two components can be aspects of a same overall signal or different multiplexed signals. The X component and the Y component are propagating within the input waveguide via spatial modes of different orthogonal polarization states, i.e. one of the X and Y components propagates according to a mode (or possibly multiple modes) of the TE state while the other propagates according to a mode (or possibly multiple modes) of the TM state. The input waveguide may be an internal waveguide of a larger photonic circuit containing the photonic device 100, or possibly an external waveguide coupled to the photonic device. It can be assumed for simplicity that the X component is propagating according to a single mode, typically a fundamental mode such as TE0 or TM0. However, it is also possible that the X component is propagating according to a higher-order mode, or according to multiple modes.

A controller 150 may be provided and configured to provide electrical control signals to the modulator 120. This may include providing a controlled electrical drive signal to components of the modulator to cause a controlled amount of carrier injection phase shift, thermo-optic phase shift, or combination thereof.

In some embodiments, an additional modulator 105 or 135 can be provided. The additional modulator 105 is coupled to the input of the first mode converter 110, while the additional modulator 135 is coupled to the output of the second mode converter 130. The purpose and operation of the additional modulator is explained for example with respect to FIG. 7. The modulator 120 and the additional modulator (when present) are both coupled to the controller 150 and configured to operate together to modulate the optical signal, for example with a portion of the modulation being done by each modulator.

The first mode converter 110 operates on one (or possibly both) of the X and Y components, in order to convert these components such that both components are subsequently propagating in the same polarization state as each other, but also such that the X component is propagating according to different spatial modes than the Y component. For example, the X component may be passed through the first mode converter unchanged, while the Y component can be converted to have the same polarization state as the X component but a different mode than the X component. Causing the X and Y components to have different modes avoids undesired mixing of the two components.

In a more specific example, the X component may be propagating in the input waveguide according to TE0, and the Y component may be propagating in the input waveguide according to TM0. The first mode converter 110 may pass the X component substantially unchanged while converting the Y component from TM0 to TE1. However, it is noted that other conversions are also possible. Accordingly, in some embodiments, the first mode converter 110 converts either the X or Y component from the fundamental mode to a higher-order mode, while also changing its polarization state. This results in the X and Y components propagating in different spatial modes of the same polarization state, which is either the TE or TM state.

Output of the first mode converter 110 is provided to the modulator 120. The modulator is a single device which is configured to simultaneously operate on all the modes output by the first mode converter in a same or at least similar manner. This includes applying the same or similar amplitude adjustment (e.g. attenuation), phase shifts, or both, to all of these modes. As such, the modulator 120 treats both the X and Y signal components together and in a same or similar manner. As mentioned above and discussed further below, such a modulator is easier to construct than one which would treat signal components of different polarization states in the same manner. Details of possible modulator construction and operation are discussed elsewhere herein.

For definiteness, the amounts of attenuation, phase shift, or both, applied to two modes may be similar in the following sense. Assume the X signal component is propagating in one of the two modes and has value x(t) at time t. Similarly, the Y signal component is propagating in the other of the two modes and has value y(t) at time t. When subjected to attenuation, the X component is altered to have value ax(t), and the Y component is altered to have value by(t). For the attenuation amounts to be similar, the ratio a/b is close to one, for example between 0.95 and 1.05. Similarly, when subject to phase shift, the instantaneous X phase component, denoted φ_x(t), is altered to have value φ_x(t)+c, and the instantaneous Y phase component, denoted φ_y(t), is altered to have value φ_y(t)+d at time t. For the phase shift amounts to be similar, the normalized difference (c−d)/(2*pi) is close to zero, for example between −0.05 and 0.05. It is noted that both attenuation and phase shift can also occur.

The modulator 120 may be responsive to a provided control signal (from controller 150) to modulate the X and Y signal components in a particular manner, for example by applying a certain amount of attenuation (in the case of a VOA), a certain amount of phase shift (in the case of a phase shifter), or both, commensurate with the control signal. It is noted that a certain amount of phase shift may be applied as a (possibly unavoidable) by-product of an attenuation operation, and similarly a certain amount of attenuation may be applied as a by-product of a phase shifting operation.

The modulator 120 may be formed in a multimode waveguide supporting the multiple spatial modes in which the X and Y components are propagating. As already mentioned above, upon receipt by the modulator, the X and Y components are propagating in different spatial modes of the same polarization state, e.g. X may be propagating according to TE0 and Y may be propagating according to TE1. The modulator 120 may be configured to implement adiabatic mode conversions that do not result in a change of polarization orientation.

The modulator 120 may comprise a waveguide operatively coupled to a p-i-n junction and be configured to controllably modulate the optical signal components via a carrier injection effect. The modulator 120 may comprise a waveguide operatively coupled to a thermal heater or cooler and be configured to controllably modulate the optical signal components via a thermo-optic effect. This may be the case for example when the modulator is primarily a phase shifter.

Output of the modulator 120 is provided to the second mode converter 130. The second mode converter is configured to operate on one (or possibly both) of the X and Y components, in order to convert these components such that the X component is propagating in a different polarization state from the Y component. Propagation modes may also be changed. For example, the X component may again be unchanged, while the Y component is converted to have the opposite polarization state. The second mode converter may essentially reverse the conversion operation of the first mode converter, in order to revert the X and Y components to their original propagation modes and polarization states.

In a more specific example, at the input to the second mode converter 130, the X component may be propagating according to TE0, and the Y component may be propagating according to TE1. The second mode converter 130 may pass the X component substantially unchanged while converting the Y component from TE1 back to TM0. However, it is noted that other conversions are also possible. Accordingly, the second mode converter 130 may convert either the X or Y component from a higher-order mode to the fundamental mode, while also changing its polarization state. This results in the X and Y components propagating in different polarization states, and possibly the same order of mode (e.g. fundamental mode).

Alternatively, the second mode converter may act on the X signal component to change its polarization state, while leaving the polarization state of the Y component unchanged. As such, the output of the overall apparatus may be rotated in polarization relative to its input, such that TE modes are changed to TM modes and vice-versa. The mode orders of the X and Y components may be left unchanged or changed. For example the mode order of the Y may be converted to the fundamental mode (e.g. TE0 or TM0).

The second mode converter may be operatively coupled to an output waveguide, which is configured to receive and propagates the X and Y components provided thereto, in the polarization states and spatial modes (e.g. TE0 and TM0) in which these components are provided by the second mode converter 130. The additional modulator 135, when present, may be interposed between the second mode converter and the output waveguide.

It is considered that one or more additional photonic components can be coupled between the first mode converter 110 and the modulator 120, or between the modulator 120 and the second mode converter 130. However, unless otherwise compensated for, it may be required to limit the number of components and waveguide length between the mode converters, due to potential divergence in properties of signals propagating according to different spatial modes (e.g. TE0 vs. TE1). This may be due to different propagation speeds, different attenuation rates, etc.

Figure 2A:
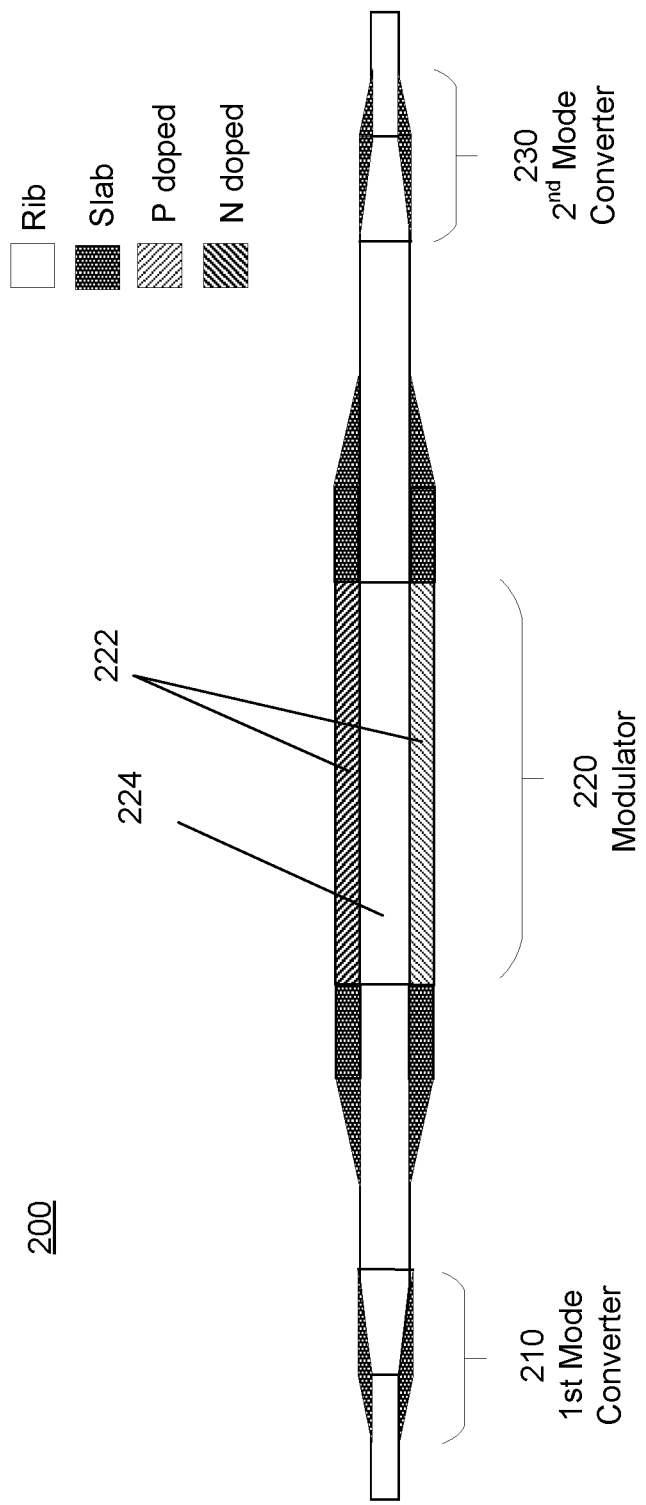
FIG. 2A illustrates a photonic device provided according to embodiments of the present invention.

FIG. 2A illustrates a photonic device 200 provided according to another embodiment of the present invention. The photonic device 200 is a particular implementation of the photonic device 100 illustrated in FIG. 1. The device 200 may be provided as a VOA.

The photonic device 200 includes a modulator 220, which comprises a p-i-n junction 222 in waveguide form, with the waveguide 224 supporting at least two transverse modes. The photonic device 200 also includes a first mode converter 210 which converts the fundamental mode of one of the polarization states (TM or TE) to a higher-order mode of the alternate polarization state. For example, the first mode converter 210 can convert TM0 to TE1. In such an example, any component of an incoming signal propagating via TM0 prior to the converter 210 is converted so that, after the converter, this component propagates via TE1. At the same time, the first mode converter 210 passes unchanged the fundamental mode of the alternate polarization state (e.g. TE0).

The photonic device 200 also comprises a second mode converter 230 configured performs the reverse function of the first mode converter 210. That is, the second mode converter 230 converts the higher-order mode of a polarization state (being for example the polarization state to which the first mode converter converts) to the fundamental mode of the other polarization state. For example, the second mode converter 230 can convert TE1 to TM0. In such an example, any component of an incoming signal propagating via TE1 prior to the converter 230 is converted so that, after the converter, this component propagates via TM0. At the same time, the second mode converter 230 passes unchanged the fundamental mode of the other polarization state (e.g. TE0).

As will be readily understood by a person skilled in the art, mode converters can be implemented in silicon waveguides by introducing a transition from a ridge waveguide to a rib waveguide, and varying the cross-section along the propagation direction such as to generate a modal crossover.

According to embodiments of the present invention, the first mode converter, the second mode converter, or both, can be provided as bi-level taper mode converter structures. Applicable such structures are described in Jing Wang et al., "Proposal for fabrication-tolerant SOI polarization splitter-rotator based on cascaded MMI couplers and an assisted bi-level taper," Optics Express vol. 22 no 23 p 27869 (2014), and Yangjin Ma et al., "Symmetrical polarization splitter/rotator design and application in a polarization insensitive WDM receiver," Optics Express vol. 23 no. 12 p. 16052 (2015), both of which are incorporated herein by reference. Such mode converters can receive an X signal component in the form of a TE0 mode and a Y signal component in the form of a TM0 mode, and convert the Y signal component to a TE1 mode while leaving the X signal component unchanged in mode and polarization. These mode converters can also operate in the opposite manner, receiving an X signal component in the form of a TE0 mode and a Y signal component in the form of a TE1 mode, and converting the Y signal component to a TM0 mode while leaving the X signal component unchanged in mode and polarization.

Within the modulator 220, a waveguide 224 receives an optical signal from the first mode converter 210 and propagates the optical signal toward the second mode converter 230. The waveguide 224 is integrated with a p-i-n junction structure 222 which controllably affects optical properties of the waveguide 224 via carrier injection. The p-i-n junction 222 is operatively coupled to an electrical control circuit which operates to cause carriers to be injected into the p-i-n junction 222 at a controllable intensity. When carriers are injected into the p-i-n junction 222, it operates to cause a controllable attenuation of the optical signals propagating in the associated waveguide 224. This attenuation affects including components of multiple propagating modes. Additionally or alternatively to the controllable attenuation, the p-i-n junction may operate to cause a controllable phase shift of the optical signals propagating in the waveguide 224.

The amount by which the attenuation (or phase shift, or both) of a given mode in the waveguide 224 can be changed in response to a nominal change in carrier injection characterizes the modulation strength of the device, for that particular mode. The modulation strength is substantially proportional to the overlap of each of the optical modes with the injected carriers (referred to as modal overlap), which are strongly, if not exclusively, located in the silicon. Thus the modulation strength depends on the modal overlap with the silicon material in the waveguide cross-section. The waveguide cross-section typically comprises silicon and at least one surrounding material such as silica.

Depending on the waveguide cross-section, the modal overlap between the modes of the TE state (also referred to as TE modes) and the modes of the TM state (also referred to as TM modes) may differ significantly. This has been observed to be the case for typical single-mode waveguides in a 220 nm thick Silicon on Insulator (SOI) structure. It can be observed that in a slab or multimode waveguides in 220 nm thick SOI, TM modes generally have less overlap with the silicon than TE modes. It follows that, in a modulator comprising a multimode waveguide in 220 nm thick SOI, the modal overlaps with the silicon material for two modes of the same polarization state can be made to be more similar to each other than the modal overlaps with the silicon material of two modes of different polarization states. Thus, for example, when the TM0 modal component is converted to a TE1 modal component (as is done in embodiments of the present invention), then, in the p-i-n junction, the attenuation (or phase shift, or both) of both modes can be made to be more similar than if the TM0 mode had not been converted. The value of the modal overlaps with the silicon material of the respective modes depends on the configuration of the cross-section of the waveguide modulator, which includes the width of the rib, etch depth, doping profile, and wavelength.

More specifically, in the case of a 220-nm thick silicon platform, in a rib waveguide having a rib width of 1.5 micrometers and an etch depth of 130 nm, the TE0 and TE1 modal overlaps with silicon are nearly identical at the 1550 nm wavelength. Thus, with the addition of a TM0 to TE1 mode converter before the p-i-n junction, in the form of the first mode converter 210, the attenuation (or phase shift, or both) of the X and Y components of the input signal, initially coupled to TE0 and TM0 modes respectively, are substantially equalized and thus the modulator can be deemed to be more polarization independent. In an embodiment, the second mode converter 230 restores the Y component back to a TE0 mode, which restores the output optical signal to a format similar to that at the input of the device. The second mode converter 230 may have the same general structure as the first mode converter 210, but oriented in the reverse direction with respect to the direction of propagation of light through the device 200.

Figure 2B:
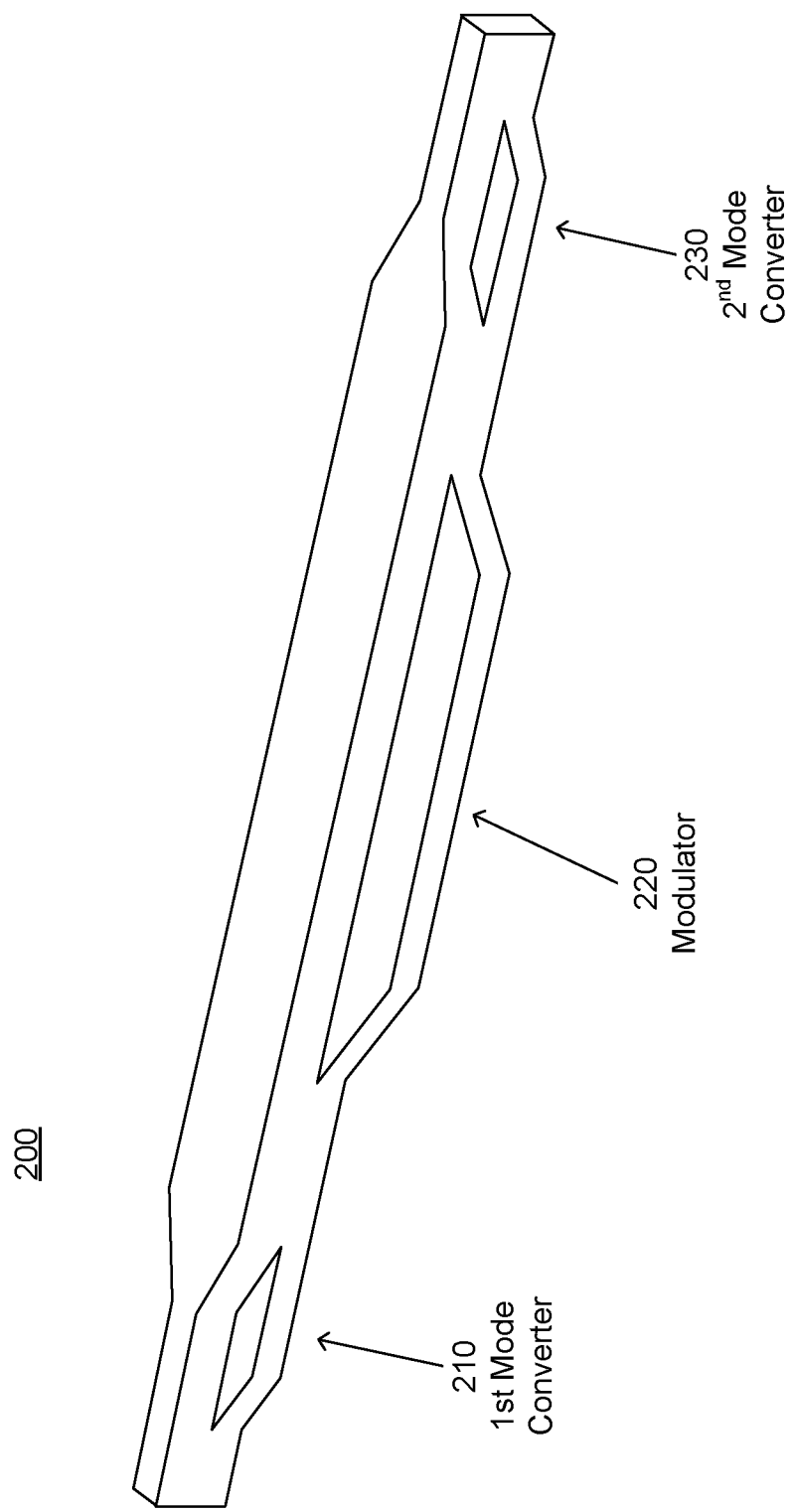
FIG. 2B is a perspective view of the photonic device of FIG. 2A.

FIG. 2B illustrates a three-dimensional perspective view of the photonic device 200, according to an embodiment of the present invention.

Figure 3A:
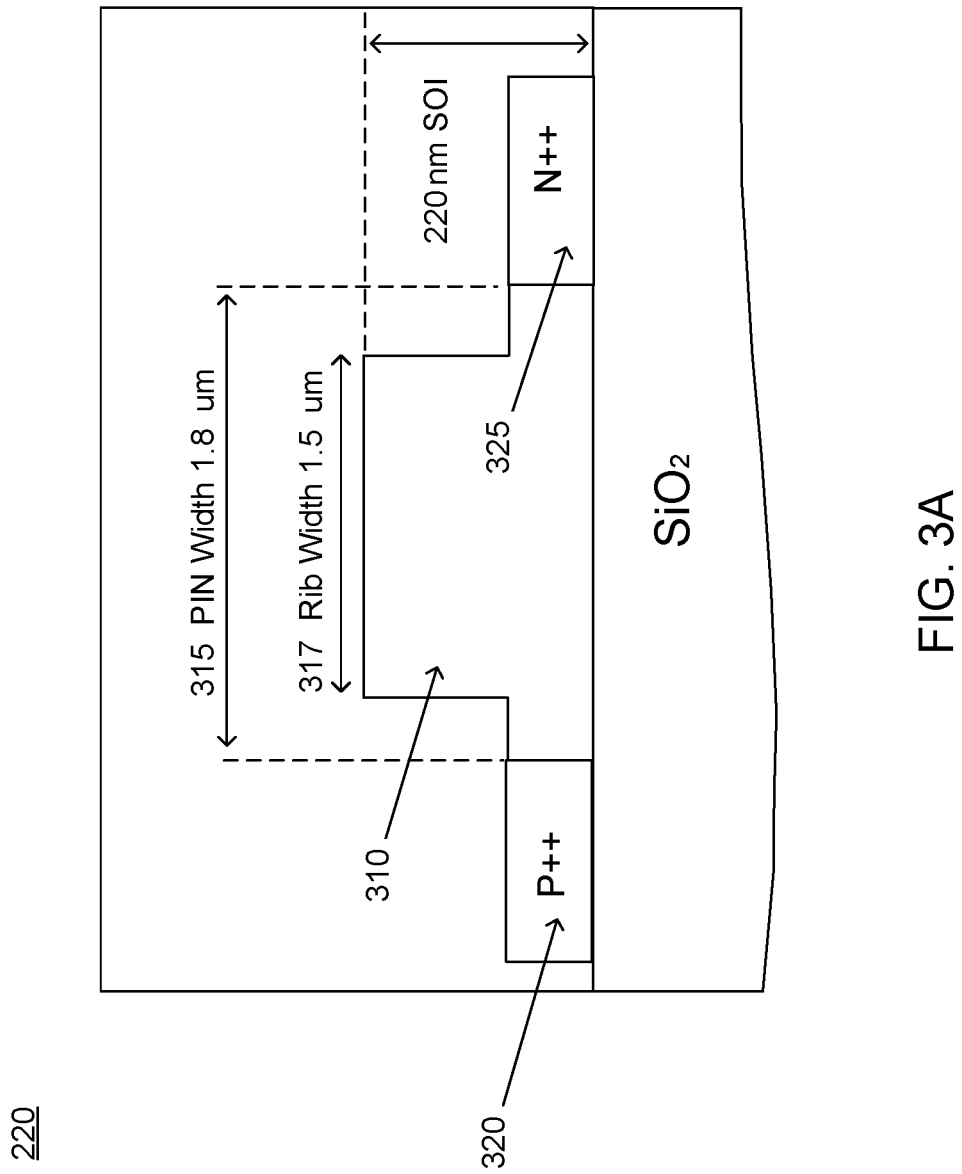
FIG. 3A is a cross sectional view of a multimode modulator of a photonic device, according to an embodiment of the present invention.

FIG. 3A illustrates a cross-sectional view of the modulator 220, according to an embodiment of the present invention. The waveguide 222 of the modulator is configured as a rib waveguide comprises of a silicon section 310 disposed overtop of a silica ($SiO_2$) substrate. However, other materials may also be used. In this example embodiment, the Silicon thickness is 220 nm, the total width 315 of the silicon section 310 is 1.8 micrometers, and the rib width 317 of the silicon section 310 is 1.5 micrometers. Conductive portions 320 and 325 are connected to the side edges of the silicon section 310 at its widened base. Conductive portion 320 labelled P++, Conductive portion 325 labelled N++ and undoped silicon portion 310 forming the waveguide core form what is known as a p-i-n junction. Under forward bias via either one or both of an electrical voltage and current provided by a controller, the p-i-n junction generates positive and negative carriers in the undoped region 310.

The waveguide is configured, for example by configuring the width thereof, to support at least two modes via which the signal is expected to propagate through the modulator. For example, the waveguide may be configured to support both TE0 and TE1 modes.

Figure 3B:
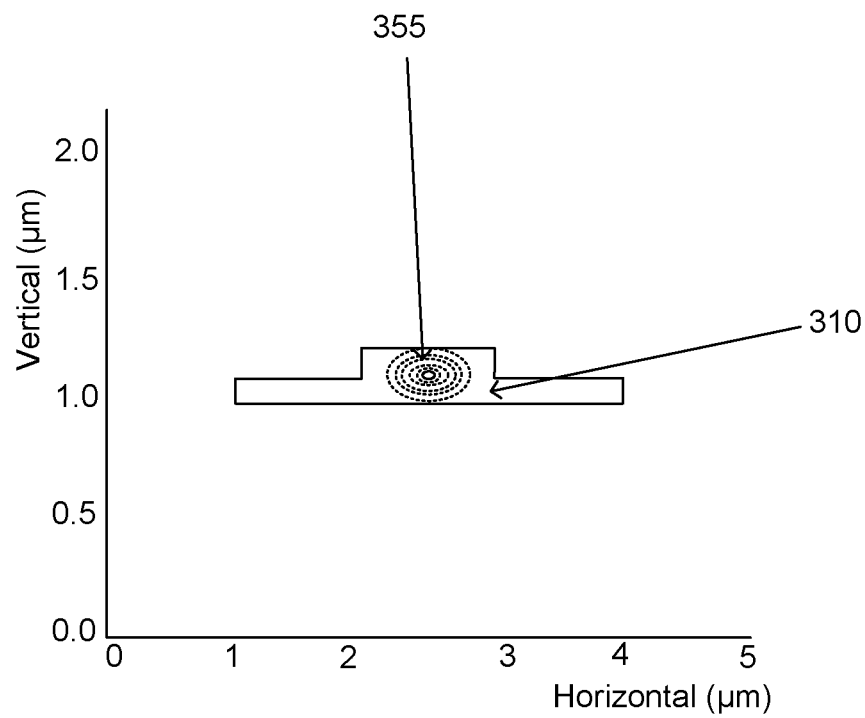
FIG. 3B illustrates the modal intensity profile of a TE0 mode and modal overlap with the waveguide core of a multimode modulator, according to an embodiment of the present invention.
Figure 3C:
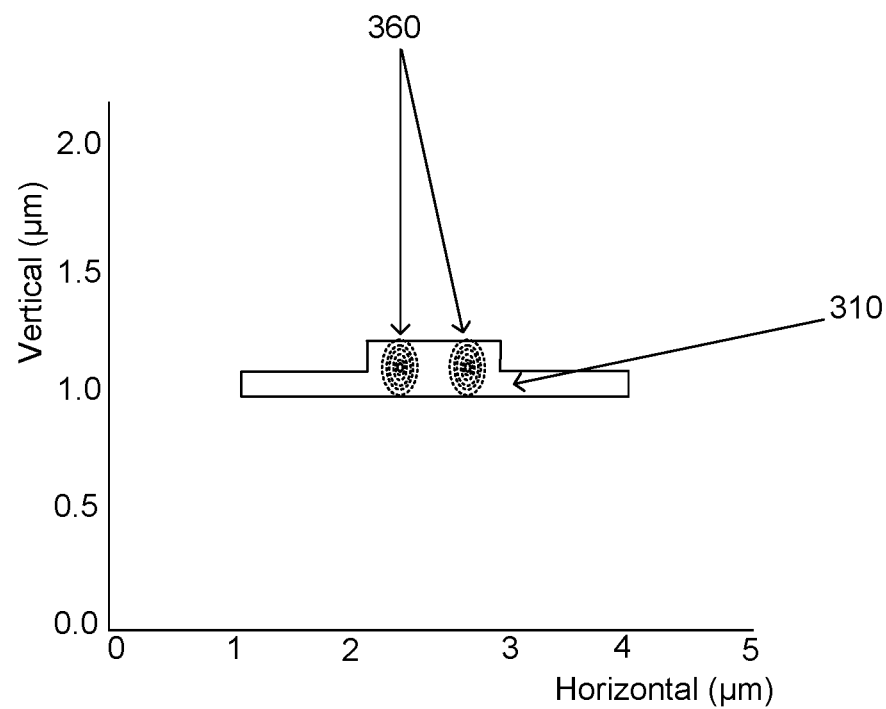
FIG. 3C illustrates the modal intensity profile of a TE1 mode and modal overlap with the waveguide core of a multimode modulator, according to an embodiment of the present invention.
Figure 3D:
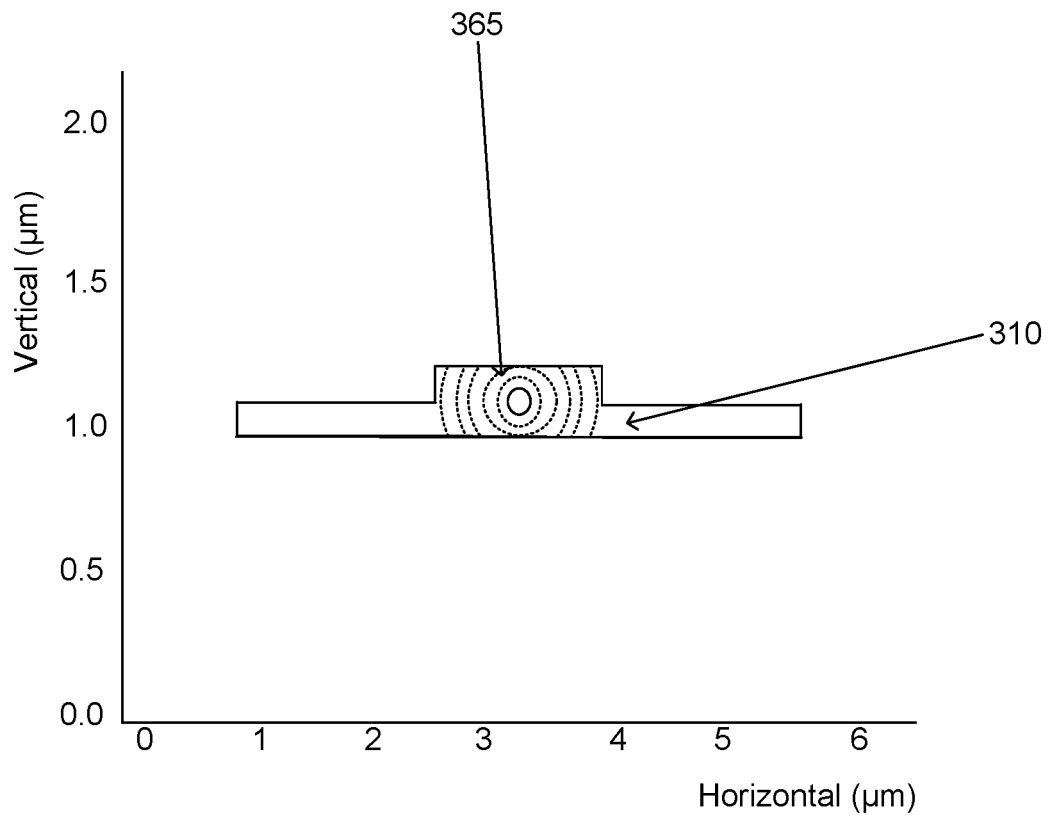
FIG. 3D illustrates the modal intensity profile of a TM0 mode and modal overlap with the waveguide core of a multimode modulator, according to an embodiment of the present invention.

FIG. 3B illustrates the optical intensity profile of a TE0 mode 355 within the waveguide of FIG. 3A, according to an example embodiment. The modal overlap with the silicon section 310 in this case is about 0.82. For comparison, FIG. 3C illustrates the optical intensity profile of a TE1 mode 360 within the same waveguide of FIG. 3A, according to an example embodiment. The modal overlap with the silicon section 310 in this case is also about 0.82. Accordingly, because modulation strength is substantially proportional to modal overlap, the modulation strength is substantially equalized for TE0 and TE1. In contrast, FIG. 3D illustrates the optical intensity profile of a TM0 mode 365 within the waveguide of FIG. 3A, according to an example embodiment. The modal overlap with the silicon section 310 in this case is about 0.50. As such, TM0 would experience significantly lower modulation strength than TE0 and TE1. The differential group delay (DGD) between TE0 and TE1, in the present example, can be calculated to be about 0.3 ps/mm, whereas the DGD between TE0 and TM0 is about 2 ps/mm. The DGD represents a propagation speed difference between the two subject modes. The smaller DGD for TE0 and TE1 facilitates treating of TE0 and TE1 together while mitigating the spreading out of the signal components propagated via these two modes.

Figure 4A:
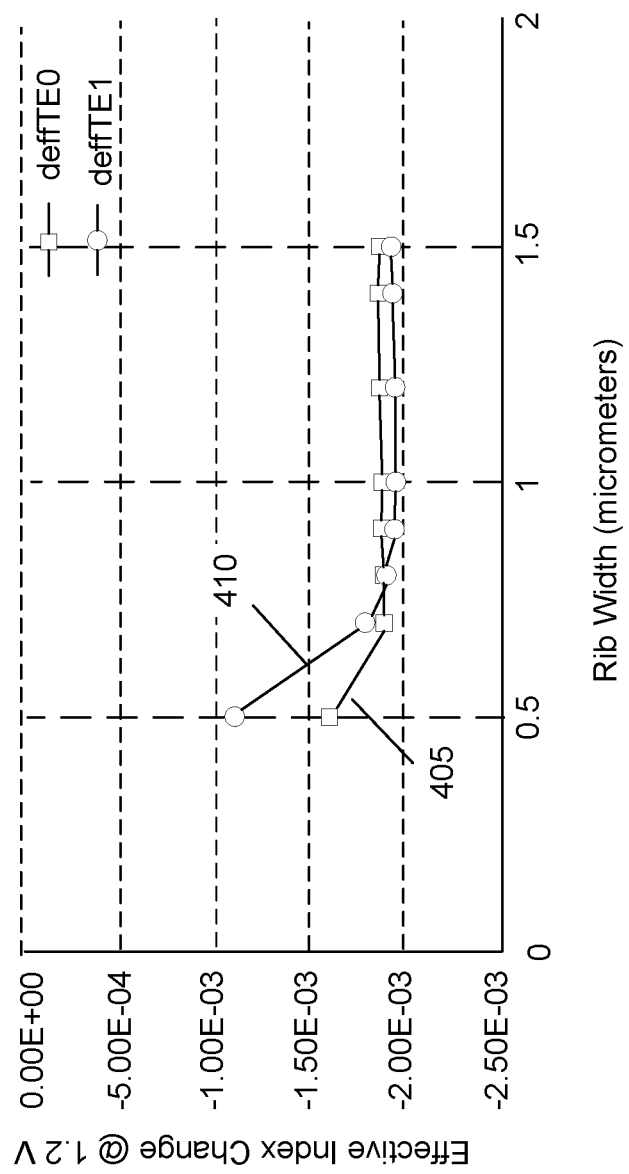
FIGS. 4A and 4B illustrate an example of performance aspects of embodiments of the present invention in relation to FIG. 3A.
Figure 4B:
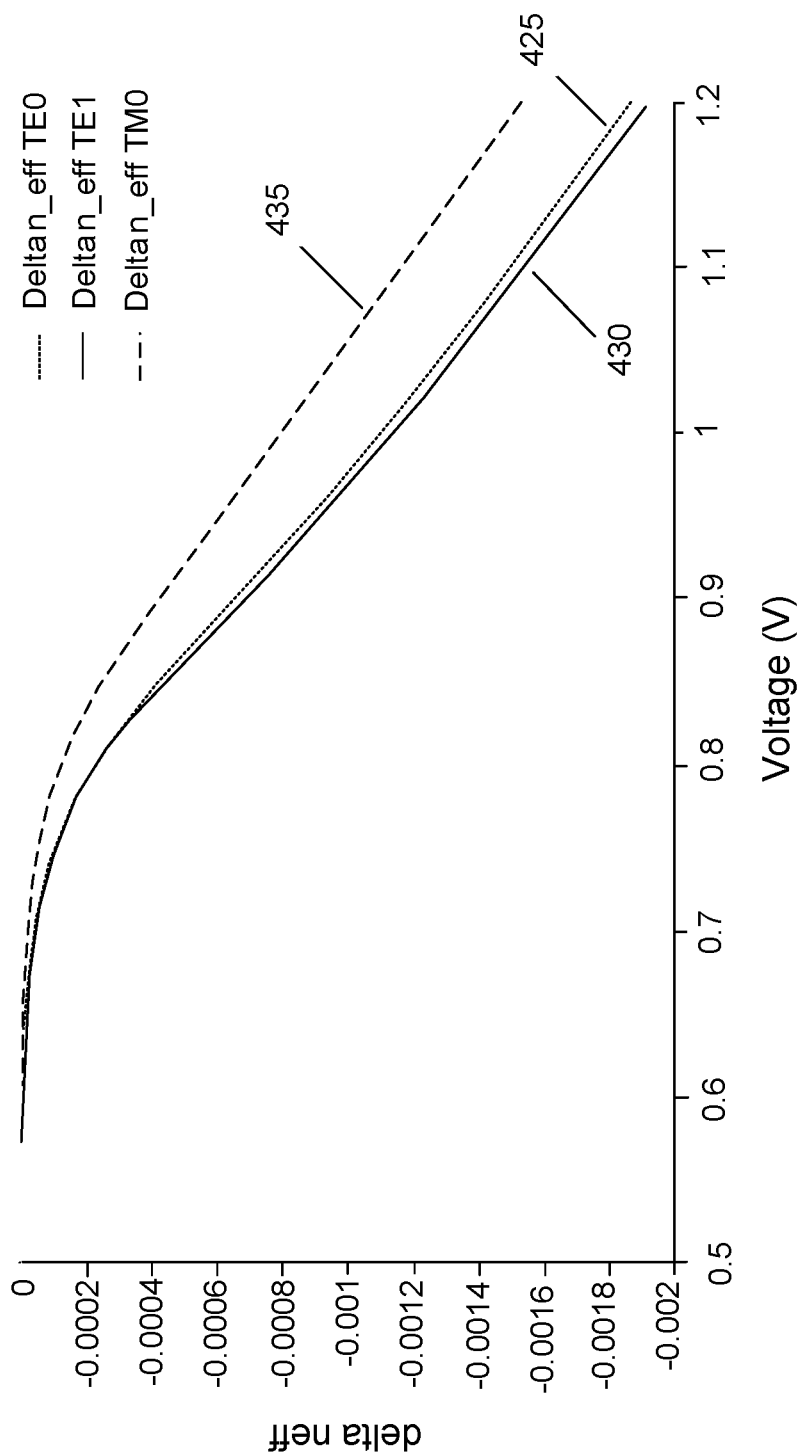

FIGS. 4A and 4B illustrate, by way of further example, the variation of performance with respect to rib width, for example embodiments of the present invention in relation to FIG. 3A. FIG. 4A illustrates, for a variety of rib widths, the effective refractive index change for both TE0 405 and TE1 410 at 1.2 volts of control signal. As can be seen, when the rib width exceeds about 0.8 micrometers, both TE0 and TE1 behave similarly, and thus the modulation strength of the device is similar for both TE0 and TE1 at these rib widths. FIG. 4B illustrates, for a rib width of 1.5 micrometers, the effective refractive index changes for TE0 425, TE1 430 and TM0 435 over a continuum of control signal voltages. As can be seen, the effective refractive index changes for TE0 425, TE1 430 are similar over the entire illustrated voltage range, and thus the modulation strength of the device is similar for both TE0 and TE1 over this voltage range. The TE0 and TE1 modulation can thus be substantially equalized (within 0.15 dB) with significant tolerance to rib width variation. While effective refractive index is typically associated with phase shift, it can be used as a surrogate measure for attenuation performance as well.

The device 200 of FIGS. 2A and 2B includes significantly fewer components than would be required for a typical polarization diversity design. In the polarization diversity implementation, there would be at least two additional optical components in the path of each of the X and Y signal components, serving to separate and combine the TE1 component through its conversion to the TE0 mode of a second waveguide. There would also typically be a second active component (such as a p-i-n junction). Thus device 200 potentially exhibits lower complexity, smaller footprint, and reduced impairment, in comparison to the prior art. This can lead to cost reduction and increased market opportunities, as insertion loss can be a critical factor for adoption of SiPh technology.

Figure 5:
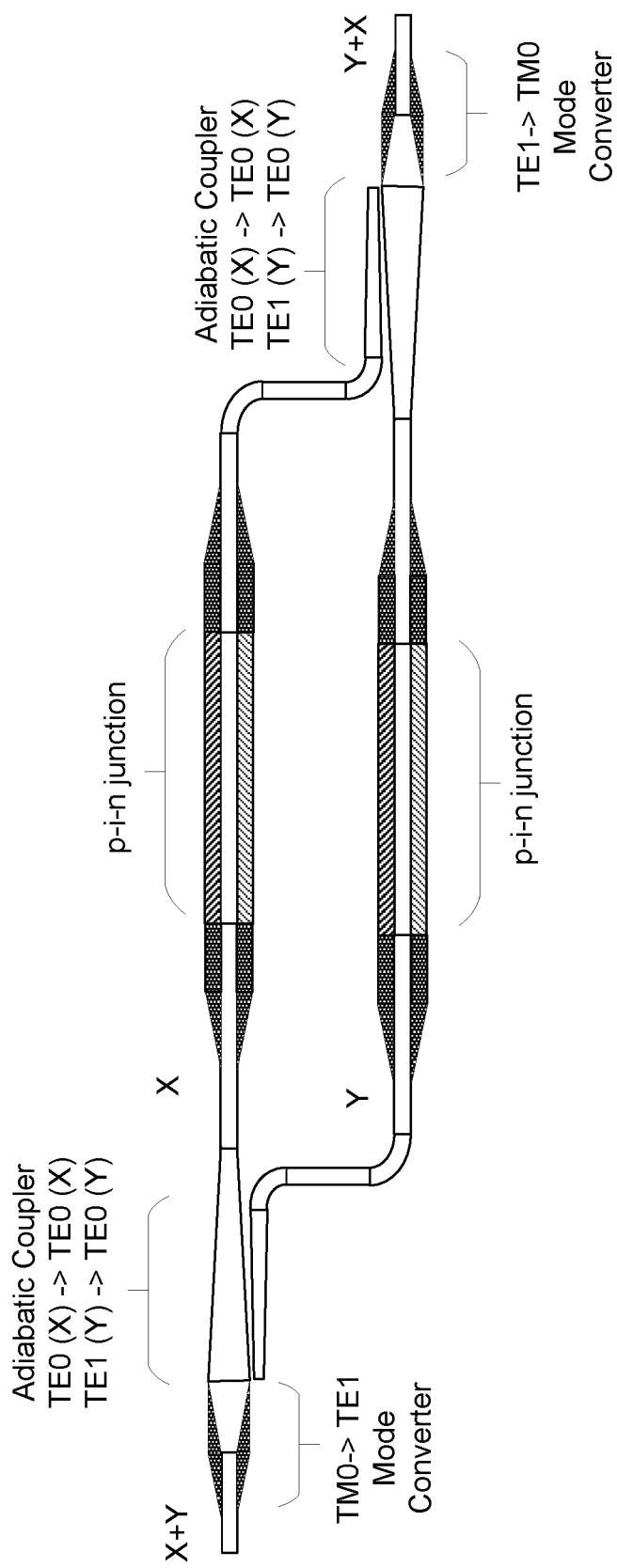
FIG. 5 illustrates an alternative implementation to embodiments of the present invention, incorporating polarization diversity.

FIG. 5 illustrates an example polarization diversity implementation for comparison, which is not necessarily admitted prior art. In contrast to embodiments of the present invention as discussed above, the example implementation of FIG. 5 treats the X signal component using a first modulator, and treats the Y signal component using a second, separate modulator.

The device 200 may also confer a performance advantage compared to a mid-point polarization rotation approach. Waveguide polarization rotators, in which both fundamental-mode polarization states (i.e. TE0 and TM0) are rotated, are either lossy (on the order of 1 dB) or exhibit high polarization crosstalk (on the order of −10 dB), or both. This approach also requires the modulator (e.g. VOA) to be divided in two parts, which increases complexity and may introduce extra loss from waveguide transitions.

Figure 6:
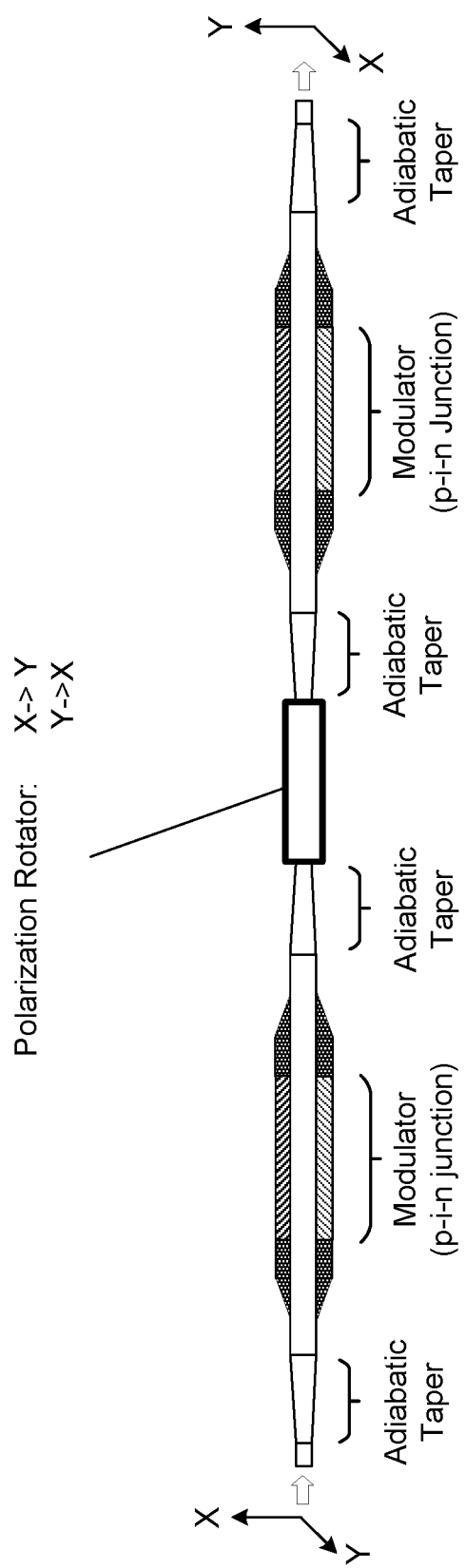
FIG. 6 illustrates an alternative implementation to embodiments of the present invention, incorporating a midpoint polarization rotation.

FIG. 6 illustrates an example device applying a mid-point polarization rotation approach for comparison, which is not necessarily admitted prior art. In contrast to embodiments of the present invention as discussed above, the example implementation of FIG. 6 does not convert signal components of two different polarization states to two different modes of the same polarization state prior to modulation. Rather, a modulation operation is performed twice, by two separate but similar modulators, with a polarization rotation operation performed in between, in order to balance out the differences in modulation strength of the modulator with respect to the two polarization states.

Figure 7:
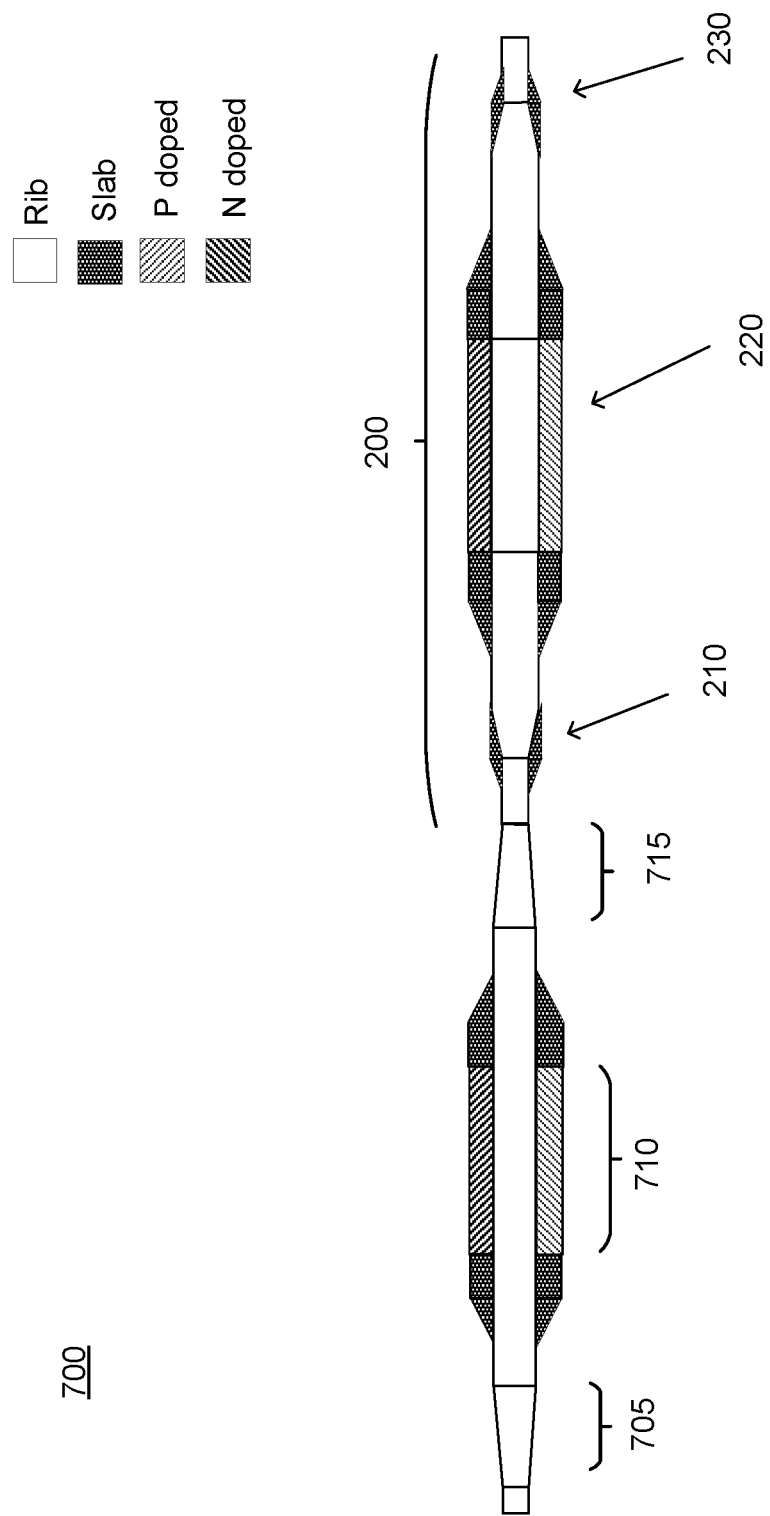
FIG. 7 illustrates a photonic device provided according to another embodiment of the present invention, in which an additional modulator is provided.

According to some embodiments of the present invention, the optical device can include an additional modulator either preceding the first mode converter or following the second mode converter. FIG. 7 illustrates such an optical device 700, in an additional modulator 710 coupled to the input of the first mode converter 210 of the photonic device 200 of FIG. 2. The additional modulator 710 can be constructed similarly to the modulator 220, for example including a p-i-n junction surrounding a rib waveguide, the p-i-n junction operatively coupled to an electrical control signal. Adiabatic tapers 705, 715 may be coupled to the input and output of the additional modulator 710, respectively.

In embodiments of the invention, as exemplified in the device of FIG. 7, if the waveguide cross section is such that $\eta\_TE1 > \eta\_TE0 > \eta\_TM0$ or $\eta\_TE1 < \eta\_TE0 < \eta\_TM0$, where $\eta\_i$ is the modal overlap of mode i with the silicon material, then equalization of the modulation can be achieved by having the Y component propagating as TM0 in a first section (comprising the tapers 705, 715 and the additional modulator 710), then as TE1 in a second section (comprising the device 200). This causes the accumulated attenuation of the Y component, due to both the first and second sections, to be substantially the same as the attenuation of the X component propagating in the TE0 mode in both sections. Such embodiments can be implemented for example in devices fabricated out of a 300 nm thick silicon layer and having a ridge width of 1.5 micrometers, for example, which can have the desired modal overlap conditions. An example of modal overlap in 300 nm silicon is $\eta\_TE1=0.87$, $\eta\_TE0=0.90$ and $\eta\_TM0=0.92$.

More generally, when the X component of the signal propagates according to a first mode of a first polarization state (e.g. TE0), the Y component of the signal can be made to propagate in a first portion of the device according to a mode of a second polarization state (e.g. TM0), and to propagate in a second portion of the device according to a second mode of the first polarization state (e.g. TE1). Further, the first portion of the device can include a first attenuator (corresponding to the additional attenuator above) and the second portion of the device can include a second attenuator. Due for example to modal overlap, the first attenuator can exhibit a modulation strength which is higher for the mode of the second polarization state than for the first mode of the first polarization state. Furthermore, the second attenuator can exhibit a modulation strength which is lower for the second mode of the first polarization state than for the first mode of the first polarization state. By operating the two attenuators in series, but interspersed with modal conversions, these two differences in modal overlap tend to balance out. This results in a more balanced attenuation for the X and Y components. In other words, the first attenuator may act to compensate for any difference in modulation strength in the second attenuator. A similar effect can be obtained for phase shift, or a combination of phase shift and attenuation.

The embodiment illustrated in FIG. 7 presents similar advantages to other embodiments discussed herein, relative for example to the polarization diversity approach. However it is noted that the additional modulator 710 adds complexity and may require additional rib to ridge waveguide transitions. It is noted that rib to ridge transitions can be designed to have insertion losses on the order of 0.05 dB in a 220 nm SOI implementation. Such embodiments may still be advantageous, despite the requirement for an additional modulator, in that, in each individual attenuator, the modulation strengths of different modes do not have to be as precisely matched.

Figure 8:
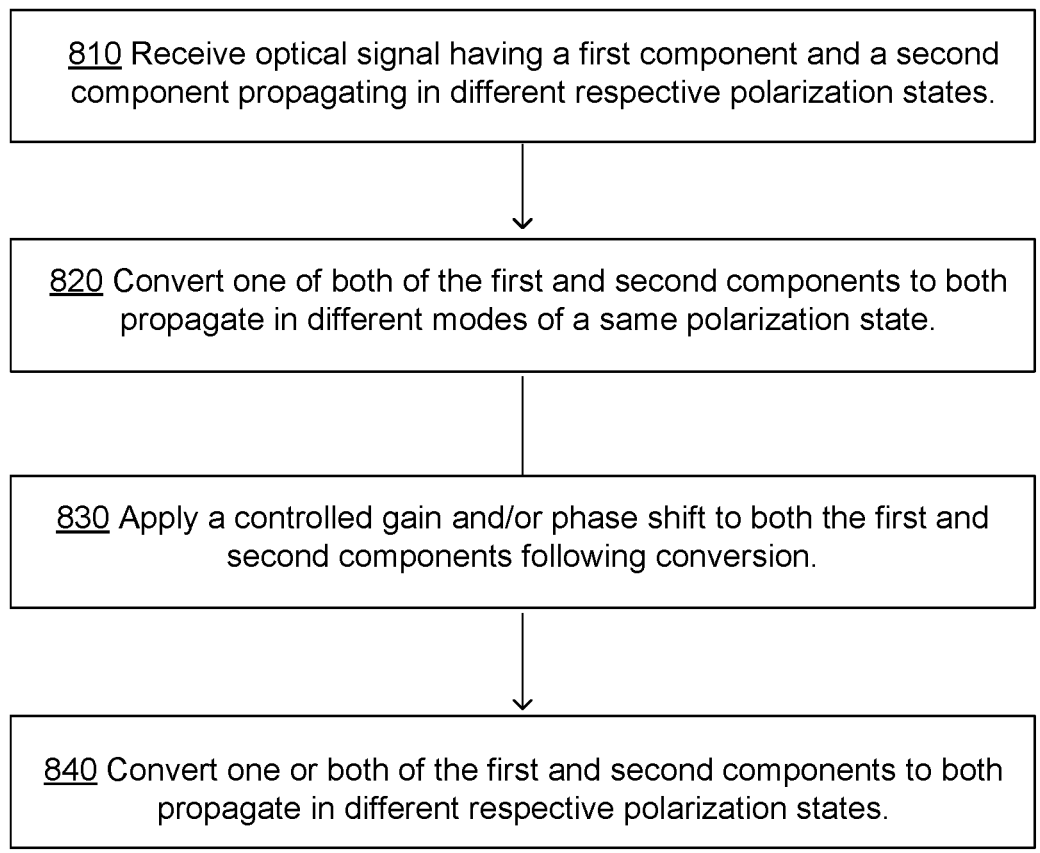
FIG. 8 illustrates a method for modulating an optical signal in a photonic device, according to an embodiment of the present invention.

FIG. 8 illustrates a method 800 for modulating an optical signal in a photonic device, according to an embodiment of the present invention. The optical signal initially has a first component and a second component propagating in different respective polarization states (TE and TM states), and the method may include receiving 810 such an optical signal. The method further includes converting 820 one or both of the first component and the second component to both propagate in different respective modes of a same polarization state (e.g. TE0 and TE1). The method further includes applying 830 a controlled gain, a controlled phase shift, or both, to both the first component and the second component following said converting. The method may further include converting 840 one or both of the first component and the second component, following said applying the controlled gain, to cause the first component and the second component to propagate in different respective polarization states (TE and TM states).

In some embodiments, the converting may be applied only to one of the components. For example, the second (Y) signal component may be converted from TM0 to TE1 in operation 820, and converted back from TE1 to TM0 in operation 840, while the first (X) signal component may be substantially unconverted in both operations 820 and 840. Other features and variations of the method 800 can be included as will be readily understood in view of the preceding discussion and apparatus description.

Embodiments of the present invention may be provided as part of a VOA for use in pilot tone generation or another application. Embodiments of the present invention may be provided as part of a phase modulator such as a thermo-optic phase modulator, or to a Mach-Zehnder device, provided that polarization-independent couplers, which are believed necessary, can be implemented.

Embodiments of the present invention provide for a multimode actuator (also referred to herein as a multimode modulator) in which multiple, and possibly all, modes are actuated (e.g. modulated) simultaneously within the same waveguide. The multimode actuator may be preceded by a modal converter that converts one of the polarization components of an input optical signal to a mode having a different polarization state, and having a different spatial mode than another of the polarization components of the input signal. The multimode actuator may be both preceded and followed by modal converters such as the output signal has the same polarization characteristics as the input signal. Alternatively, the multimode actuator may be preceded and followed by modal converters such as the output signal has reversed polarization characteristics relative to the input signal.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to at least one of the method of the technology and to structure some or all of its components in accordance with the system of the technology.

Acts associated with the method described herein can be implemented at least in part using coded instructions in a computer program product. In other words, the computer program product is a computer-readable medium upon which software code is recorded to execute the method when the computer program product is loaded into memory and executed on the microprocessor of the wireless communication device. The computer (e.g. a controller) can direct or drive devices such as a modulator as described herein.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. A photonic device comprising:
    a first mode converter configured to: receive an optical signal having a first component and a second component propagating in different respective polarization states; and convert one or both of the first component and the second component to both propagate in different respective modes of a same polarization state;
    a modulator configured to: receive optical output of the first mode converter; and apply a controlled gain, a controlled phase shift, or both, to both the first component and the second component as output by the first mode converter; and
    a second mode converter configured to: receive optical output of the modulator, the optical output comprising the first component and the second component propagating in said different respective modes of the same polarization state; and convert one or both of the first component and the second component as output by the modulator to cause the first component and the second component to propagate in different respective polarization states.

2. The photonic device of claim 1, wherein the modulator comprises a multimode waveguide configured to carry both of said different respective modes of the same polarization state and the modulator is further configured to apply the controlled gain, the controlled phase shift, or both, concurrently to each of said different respective modes within the multimode waveguide.

3. The photonic device of claim 2, wherein the modulator further comprises a p-i-n junction structure operatively coupled to the multimode waveguide and configured to apply the controlled gain, the controlled phase shift, or both, using a carrier injection effect.

4. The photonic device of claim 2, wherein the modulator further comprises a heater or cooler operatively coupled to the multimode waveguide and configured to apply the controlled gain, the controlled phase shift, or both, using a thermo-optic effect.

5. The photonic device of claim 1, wherein the modulator has a same or similar modulation strength with respect to each of said different respective modes of the same polarization state.

6. The photonic device of claim 5, wherein said same or similar modulation strength is due to a corresponding same or similar modal overlap of each of said different respective modes of the same polarization state with a multimode waveguide of the modulator.

7. The photonic device of claim 6, wherein the multimode waveguide is a rib waveguide and wherein the modal overlap is configured at least in part due to a width of the rib waveguide.

8. The photonic device of claim 1, further comprising an additional modulator operatively coupled to an input of the first mode converter or operatively coupled to an output of the second mode converter, the additional modulator cooperating with the modulator and configured to apply another controlled gain, another controlled phase shift, or both, to both the first component and the second component of the optical signal, when the first component and the second component are propagating in said different polarization states.

9. The photonic device of claim 8, wherein the modulator exhibits a first difference in modulation strength across each of said different respective modes of the same polarization state, and wherein the additional modulator exhibits a second difference in modulation strength across modes of said different polarization states, the second difference in modulation strength at least partially compensating for the first difference in modulation strength.

10. The photonic device of claim 1, wherein the modulator is a variable optical attenuator, a phase shifter, or a combination thereof.

11. The photonic device of claim 1, wherein the photonic device is fabricated in a silicon-on-insulator structure.

12. The photonic device of claim 1, wherein, prior to the first mode converter, the first component propagates in a mode of a transverse electric (TE) polarization state and the second component propagates in a mode of a transverse magnetic (TM) polarization state.

13. The photonic device of claim 1, wherein the first mode converter passes the first component without mode conversion and converts the second component with respect to both mode order and polarization state.

14. The photonic device of claim 13, wherein the first mode converter converts the second component from a fundamental mode to a first order mode.

15. The photonic device of claim 13, wherein the second mode converter passes the first component without mode conversion and converts the second component with respect to both mode order and polarization state.

16. The photonic device of claim 13, wherein the second mode converter passes the second component without polarization state conversion and converts the first component with respect to polarization state.

17. A method for modulating an optical signal in a photonic device, the optical signal initially having a first component and a second component propagating in different respective polarization states, the method comprising:
  converting one or both of the first component and the second component to both propagate in different respective modes of a same polarization state;
  applying a controlled gain, a controlled phase shift, or both, to both the first component and the second component following said converting; and
  converting one or both of the first component and the second component, following said applying the controlled gain, to cause the first component and the second component to propagate in different respective polarization states.

18. The method of claim 17, wherein the controlled gain, the controlled phase shift, or both, are applied concurrently to both the first component and the second component while co-propagating in a single multimode waveguide structure.

19. The method of claim 17, wherein the controlled gain, the controlled phase shift, or both, are applied using a modulator having a same or similar modulation strength with respect to each of said different respective modes of the same polarization state.

20. The method of claim 17, further comprising, cooperatively with said applying the controlled gain, the controlled phase shift, or both: applying another controlled gain, another controlled phase shift, or both, to both the first component and the second component of the optical signal, when the first component and the second component are propagating in said different polarization states.

* * * * *